US006191959B1

United States Patent
Miermans

(10) Patent No.: US 6,191,959 B1
(45) Date of Patent: Feb. 20, 2001

(54) SWITCHED-MODE POWER SUPPLY WITH CAPACITOR CONTROLLED POWER SUPPLY

(75) Inventor: Hubertus C. Miermans, Eindhoven (NL)

(73) Assignee: U.S. Philips Corporation, New York, NY (US)

(*) Notice: Under 35 U.S.C. 154(b), the term of this patent shall be extended for 0 days.

(21) Appl. No.: 09/535,592

(22) Filed: Mar. 27, 2000

(30) Foreign Application Priority Data

May 14, 1999 (EP) .................................... 99201513

(51) Int. Cl.⁷ ............................. H02M 3/335; H02M 1/00
(52) U.S. Cl. ............................................. 363/21; 363/147
(58) Field of Search ............................. 363/20, 21.12, 363/21.15, 21.17, 97, 131, 147

(56) References Cited

U.S. PATENT DOCUMENTS

| 4,074,146 | * | 2/1978 | Buonavita | 307/60 |
| 4,328,429 | * | 5/1982 | Kublick | 307/58 |
| 4,520,275 | * | 5/1985 | Marusik | 307/64 |
| 4,635,178 | * | 1/1987 | Greenhalgh | 363/65 |
| 4,920,309 | * | 4/1990 | Szepesi | 323/269 |
| 4,924,170 | * | 5/1990 | Henze | 323/273 |
| 4,939,632 | * | 7/1990 | Plagge et al. | 363/19 |
| 5,029,269 | * | 7/1991 | Elliot et al. | 363/21 |
| 5,282,107 | | 1/1994 | Balakrishnan | 361/18 |
| 5,313,381 | | 5/1994 | Balakrishnan | 363/147 |
| 5,424,932 | * | 6/1995 | Inou et al. | 363/21 |
| 5,559,683 | * | 9/1996 | Schoenwald | 363/21 |
| 5,661,642 | * | 8/1997 | Shimashita | 363/21 |
| 5,812,383 | | 9/1998 | Majid et al. | 363/21 |
| 5,852,550 | * | 12/1998 | Majid et al. | 363/21 |
| 6,016,260 | * | 1/2000 | Heeringa | 363/21 |

OTHER PUBLICATIONS

TNY253/254/255 Tinyswitch Family, Energy Efficient, Low Power Off–Line Switchers, Jun. 1998.

* cited by examiner

Primary Examiner—Peter S. Wong
Assistant Examiner—Bao Q. Vu
(74) Attorney, Agent, or Firm—Steven R. Biren

(57) ABSTRACT

A switched-mode power supply with a burst mode comprises an integrated circuit (Ic) with a minimal number of terminals. The integrated circuit (Ic) comprises a switching element (S) for periodically switching on and off the current (Id) in a primary winding (Lp) of a transformer (T), and a control circuit (Cc) for controlling the on and off-switching of the switching element (S). The integrated circuit (Ic) has three terminals (T1, T2, T3). A main current path of the switching element (S) is arranged between two of the terminals (T1, T2). A capacitor (C1) is connected to the third terminal (T3). A capacitor voltage (Vc) across the capacitor (C1) is used as power supply voltage for the control circuit (Cc). A feedback circuit (Fb) has an input connected to a DC output voltage (Vout) supplied by a secondary winding (Ls) of the transformer (T), and an output connected to the third terminal (T3). The control circuit (Cc) further receives the capacitor voltage (Vc) for periodically switching said main current path on and off when the capacitor voltage (Vc) is in a first range indicating that the power supply voltage (Vout) is lower than the predetermined value (Vp), and for keeping said main current path in a non-conductive state when said capacitor voltage (Vc) is in a second range indicating that the power supply voltage (Vout) exceeds the predetermined value (Vp).

6 Claims, 3 Drawing Sheets

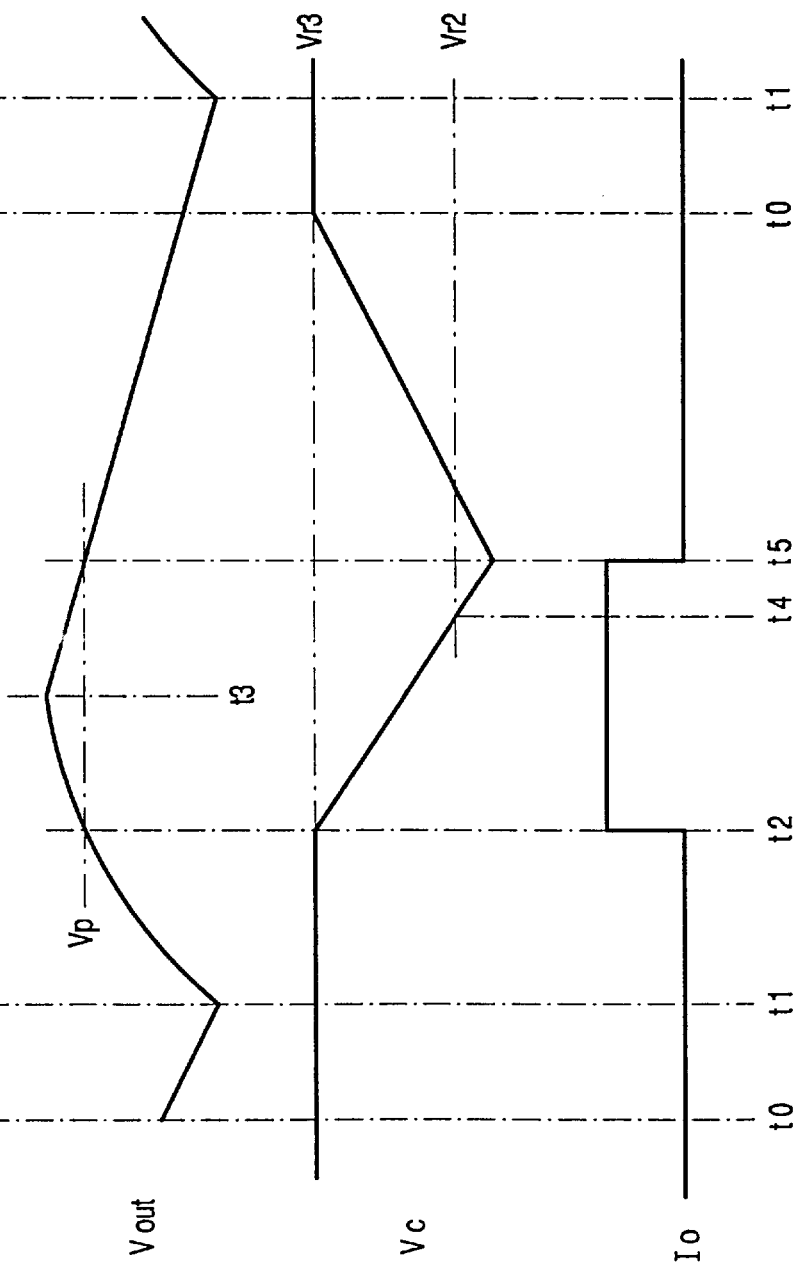

SWITCHED-MODE POWER SUPPLY WITH CAPACITOR CONTROLLED POWER SUPPLY

BACKGROUND OF THE INVENTION

The invention relates to a switched-mode power supply, and a display apparatus comprising such a switched-mode power supply.

In present day applications, especially in standby modes of apparatus, low power consumption is getting more and more crucial due to government legislation and consumer demand. The preliminary specification of the TNY253/254/255 Tinyswitch Family, Energy efficient, low power Off-line switchers of Power Integrations, Inc, June 1998 discloses a switched-mode power supply chip which is able to operate in a burst mode to obtain a high efficiency at low output power.

The disclosed switched-mode power supply comprises a four-terminal integrated circuit (further referred to as chip) which comprises a MOS field-effect transistor (further referred to as FET) with a main current path arranged between a first and a second terminal of the chip, a regulator arranged between the first terminal and a third terminal of the chip, a comparator for comparing a voltage at the first terminal with a reference voltage, and a control circuit. The control circuit comprises an oscillator, a set-reset flip-flop, several logic gates, and an under-voltage lock-out detection circuit (further referred to as under-voltage detector) for comparing a voltage at the third terminal with a further reference voltage. The detailed construction of the control circuit will be described later. The switched-mode power supply further comprises a primary winding of a transformer which is connected to the first terminal to obtain a series arrangement with the main current path of the FET. The series arrangement receives a DC input voltage. A diode is connected to a secondary winding of the transformer to generate a DC output voltage. A capacitor is connected to the third terminal of the chip. The regulator generates a voltage across the capacitor. This voltage across the capacitor is used as a supply voltage for other circuits in the chip. A feedback circuit comprises an optocoupler and receives the DC output voltage to supply a signal to a fourth terminal of the chip to indicate whether the DC output voltage exceeds a predetermined value. The control circuit is coupled to a control input of the switching element for periodically switching the main current path on and off when the feedback circuit indicates that the output voltage is lower than the predetermined value, and for keeping the main current path in a nonconductive state when the feedback circuit indicates that the output voltage exceeds the predetermined value.

The control circuit will now be described in more detail. A logic AND has a first input receiving periodical set pulses from the oscillator, a second input coupled to the fourth terminal, and an output connected to a set input of the set-reset flip-flop. A further logic AND has a first input connected to a non-inverting output of the set-reset flip-flop, a second input connected to an output of the under-voltage detector, and an output connected to the control input of the switching element. An output of the comparator is coupled to a reset input of the set-reset flip-flop. The set pulses are supplied to the set input of the set-reset flip-flop when the feedback circuit does not pull the fourth terminal low, which is the case when the DC output voltage is lower than a predetermined value. The FET will be switched on when both the set-reset flip-flop is set and the under-voltage detector detects that the voltage across the capacitor at the third terminal is higher than the further reference voltage. The main current path of the FET stays on until the voltage at the first terminal exceeds the first-mentioned reference level causing the set-reset flip-flop to reset. When the DC output voltage exceeds the predetermined level, the optocoupler diode starts emitting light and the optocoupler transistor pulls the fourth terminal to ground, thereby preventing a set of the set-reset flip-flop. Consequently, the main current path of the FET will stay off until the DC output voltage drops below the predetermined value. In this way, an energy-efficient burst mode is obtained, and the switched-mode power supply is only active during short periods of time. However, this switched-mode power supply chip requires four terminals.

SUMMARY OF THE INVENTION

It is, inter alia, an object of the invention to provide on efficient low-power switched-mode power supply of which the control circuit when integrated on a chip requires one terminal less for the same function as provided in the prior art.

To this end, a first aspect of the invention provides a switched-mode power supply as claimed in claim 1. This object is also reached by the second aspect of the invention provides a display apparatus comprising such a switched-mode power supply as claimed in claim 6. Advantageous embodiments are defined in the dependent claims.

The switched-mode power supply in accordance with the invention is based on the insight that it is possible to decrease the voltage across the capacitor without negatively influencing the behavior of the switched-mode power supply. In the prior-art switched-mode power supply, the voltage across the capacitor is used to supply power to circuits of the integrated circuit, and the feedback information is separately supplied to the control circuit via a fourth terminal to obtain the burst mode.

In the switched-mode power supply in accordance with the invention, the feedback circuit is coupled to the capacitor. When the feedback circuit detects that the DC output voltage exceeds the predetermined value, the voltage across the capacitor is pulled low. The control circuit detects that the voltage across the capacitor drops below a reference value and stops the periodical on and off-switching of the switching element (in the prior art, the FET) before the voltage across the capacitor is too low for the control circuit to operate correctly. When the DC output voltage drops below the same above-mentioned value or a lower predetermined value, the voltage across the capacitor is allowed to rise to a level at which the control circuit receives a supply voltage which is high enough to allow correct operation. Subsequently, the control circuit detects that the voltage across the capacitor rises above the reference value and the control circuit resumes the periodical on and off-switching of the switching element.

If the same function has to be provided as in the four-terminal prior-art integrated circuit, the terminal coupled to the feedback circuit will become superfluous and a three-terminal integrated circuit can be used. If an extra function has to be added, for which extra terminals are required, the switched-mode power supply in accordance with the invention will require one terminal less.

In the prior art, the under-voltage detection circuit receives the voltage across the capacitor to prevent the main current path of the FET (further referred to by the more general term switching element) from being on when the voltage across the capacitor is below a predetermined value indicating an under-voltage situation. If such an under-voltage detection circuit were also available in the control circuit in accordance with the invention, this under-voltage detection circuit would still perform its function as known from the prior art. In an under-voltage situation, the voltage across the capacitor is below the predetermined level and the main current path of the switching element will be off.

It is possible to use the under-voltage detector to detect the voltage across the capacitor and to control the control circuit accordingly. It is also possible to use a logic AND, whose input, which, in the prior art, was connected to the fourth terminal, is now connected to the capacitor.

U.S. Pat. No. 5,313,381 with Assignee Power Integrations, Inc, discloses a three-terminal switched-mode power supply chip. Such a three-terminal chip allows the use of a cheap three-terminal package which is a premium in this highly competitive field. However, this prior-art switched-mode power supply has a low efficiency at low output power.

These and other aspects of the invention are apparent from and will be elucidated with reference to the embodiments described hereinafter.

BRIEF DESCRIPTION OF THE DRAWINGS

In the drawings:

FIG. 3 shows waveforms for explaining the operation of the embodiment as shown in FIG. 2.

In different Figures, items referred to by the same reference are identical and have the same function.

DESCRIPTION OF THE PREFERRED EMBODIMENTS

Figure 1:
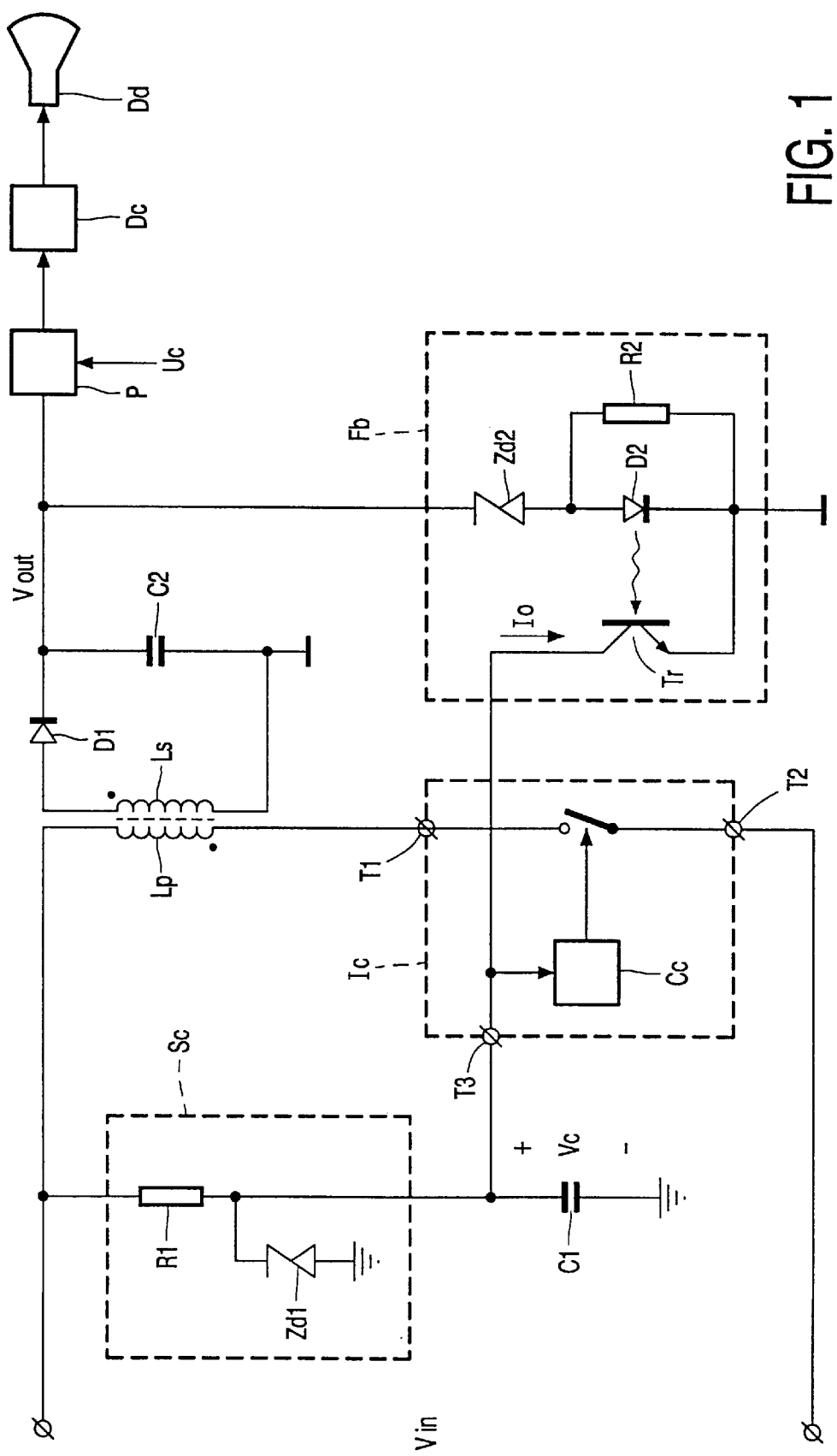
FIG. 1 shows a block diagram of a display apparatus comprising a switched-mode power supply in accordance with the invention.

FIG. 1 shows a block diagram of a display apparatus comprising a switched-mode power supply in accordance with the invention. The switched-mode power supply comprises a series arrangement of an inductor Lp and a main current path of a switching element S, while the series arrangement is coupled to receive a DC input voltage Vin. The junction of the inductor Lp and the switching element S is denoted as terminal T1. The terminal of the switching element which is not connected to the inductor Lp is denoted as terminal T2. The inductor Lp is shown to be a primary winding of a transformer T. The transformer T has a secondary winding Ls. The polarities of the primary winding Lp and the secondary winding Ls are indicated by respective dots. A rectifier element D1 is connected to the secondary winding Ls to supply a DC output voltage Vout. If no mains separation is required, the transformer T may be replaced by a single inductor Lp. In this case, the rectifier element D1 is connected to the terminal TI or to a tap on the single inductor Lp. The DC-output voltage Vout is smoothed by the capacitor C2 and supplied as a supply voltage Vout to a microprocessor P. The microprocessor P controls a drive circuit Dc. The drive circuit Dc controls the addressing of the display device Dd. In a low-power standby mode of the display apparatus, only the microprocessor P is active to process user commands Uc. In a normal operating mode of the display apparatus, also the drive circuit Dc is active, and a substantially higher power is drawn from the switched-mode power supply. To supply the power to the drive circuit Dc, a further secondary winding may be provided on the transformer (not shown). If the display device Dd is a cathode ray tube, the drive circuit Dc generates the deflection currents required to deflect the electron beam in the cathode ray tube Dd. The drive circuit Dc may further generate supply voltages for the cathode ray tube Dd, such as the anode voltage and the focus voltage.

A feedback circuit Fb has an input to receive the DC output voltage Vout and an output for indicating whether a value of the DC output voltage Vout exceeds a predetermined value. The feedback circuit Fb may comprise a series arrangement of a zener diode Zd2 and an optocoupler diode D2, and an optocoupler transistor Tr optically coupled to the optocoupler diode D2. The series arrangement is connected in parallel with the smoothing capacitor C. A resistor R2 may be arranged in parallel with the optocoupler diode D2 to enable sufficient current to flow through the zener diode Zd2. This is certainly relevant as long as the optocoupler diode D2 blocks, and improves the accuracy of the zener voltage across the zenerdiode Zd2 when the current through the optocoupler diode is selected to be small. The optocoupler transistor Tr has a main current path, one terminal of which forms the output of the feedback circuit Fb. The conductivity of the main current path of the optocoupler transistor Tr depends on the amount of light radiated by the optocoupler diode D2. Io designates the current in the main current path of the optocoupler transistor Tr.

A control circuit Cc has an output connected to a control input of the switching element S.

The switched-mode power supply further comprises a capacitor C1 and a supply circuit Sc for generating a capacitor voltage Vc across the capacitor C1 to supply power to the control circuit Cc. The supply circuit Sc may comprise a resistor R1 connected between the DC input voltage terminal connected to the primary winding Lp and the terminal T3 of the capacitor C1, and a zener diode Zd1 connected to the terminal T3 to limit and stabilize the capacitor voltage Vc. It is possible to use a more complicated supply circuit.

The output of the feedback circuit Fb is connected to the terminal T3 of the capacitor C1 to influence the capacitor voltage Vc in dependence on the value of the DC output voltage Vout.

The control circuit Cc receives the capacitor voltage Vc, periodically switches the main current path on and off when the capacitor voltage Vc is in a first range indicating that the DC output voltage Vout is lower than the predetermined value, and keeps the main current path in a non-conductive state when the capacitor voltage Vc is in a second range indicating that the DC output voltage Vout exceeds the predetermined value. The first and second ranges are non-overlapping. In this manner, an efficient burst mode occurs. The switched-mode power supply is only active when the DC output voltage Vout drops below the predetermined value.

The dashed rectangle Ic shows a possible boundary of an integrated circuit Ic which, in this case, comprises the switching element S and the control circuit Cc, and has only three terminals T1, T2, and T3.

Figure 2:
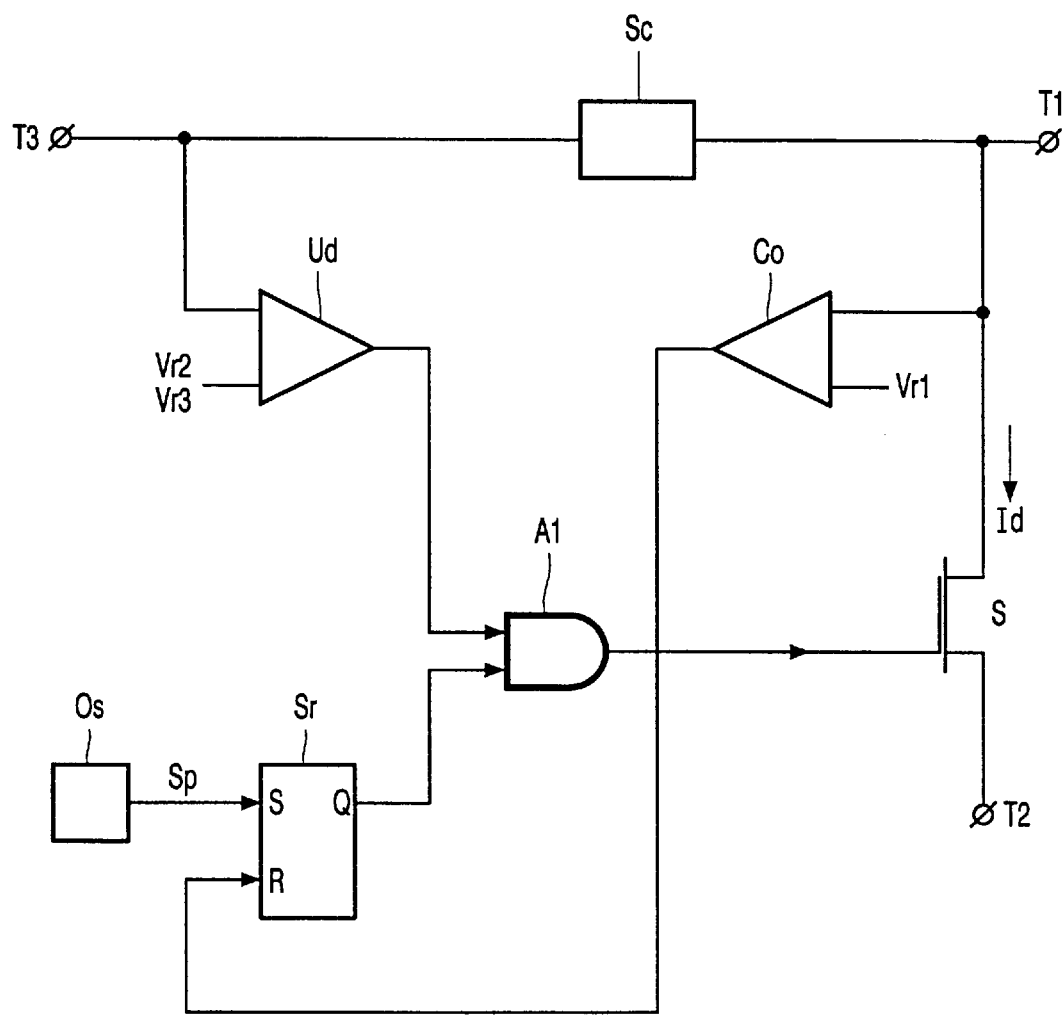
FIG. 2 shows a block diagram of an embodiment of a three-terminal integrated circuit for use in the switched-mode power supply in accordance with the invention.

FIG. 2 shows a block diagram of an embodiment of a three-terminal integrated circuit for use in the switched-mode power supply in accordance with the invention. This integrated circuit Ic fits in the switched-mode power supply as shown in FIG. 1. The terminals T1, T2, and T3 are identical in both FIGS. 1 and 2. As will become clear, the supply circuit Sc is now provided within the integrated circuit Ic, and thus the supply circuit Sc as shown in FIG. 1 has to be omitted.

The integrated circuit Ic comprises the switching element S with a main current path between the terminals T1 and T2. In FIG. 2, the switching element S is a FET, but it will be clear that other suitable semiconductor switching elements may also be used. The drain of the FET is connected to the terminal T1. An oscillator Os supplies periodical set pulses Sp to a set-input S of a set-reset flip-flop Sr. A logic AND A1 has a first input connected to a non-inverting output Q of the set-reset flip-flop Sr, a second input connected to an output of a voltage detector Ud, and an output connected (if required, via a buffer stage, not shown) to the control input of the switching element S. A voltage comparator Co has a first input connected to the terminal T1, a second input receiving a reference voltage Vr1, and an output connected to a reset input R of the set-reset flip-flop Sr. The voltage detector Ud has an input connected to the terminal T3 to compare the capacitor voltage Vc with a reference voltage Vr2 or Vr3.

The operation of the integrated circuit Ic will now be described. The set pulses Sp cause the FET S to be switched on when both the set-reset flip-flop Sr is set (the non-inverting output Q has a high level) and the voltage detector detects that the capacitor voltage Vc at the terminal T3 is higher than the reference voltage Vr2 (the output of the voltage detector has a high level). The main current path of the FET S stays on until the voltage at the terminal T1 exceeds the reference level Vr1 and the comparator Co resets the set-reset flip-flop Rs. During the time when the FET S is on and thus acts as a resistor, the voltage at terminal Ti is proportional to the current Id in the main current path of the FET S. Alternatively, it is possible to measure the current Id in the main current path by arranging an impedance in series with the main current path. This is especially relevant when a switching element S other than a FET is used.

When the DC output voltage Vout exceeds the predetermined level determined by the zener diode Zd2, the optocoupler diode D2 starts emitting light and the optocoupler transistor Tr starts discharging the capacitor C1. The voltage detector Ud detects when the voltage at the terminal T3 drops below the reference level Vr2 and subsequently prevents the main current path of the FET S from being switched on. The switched-mode power supply stops operating, and the DC-output voltage Vout starts decreasing. At a certain instant, the DC-output voltage Vout drops below the predetermined value and the optocoupler diode D2 stops conducting. The optocoupler transistor Tr no longer discharges the capacitor C1, and consequently the capacitor voltage Vc starts rising. When the capacitor voltage Vc reaches a reference voltage level Vr3, the under-voltage detector Ud allows the FET to be periodically switched on and off again. The reference voltage Vr3 is not lower than the reference voltage Vr2. When the reference voltage Vr3 is higher than the reference voltage Vr2, a hysteresis is obtained resulting in a more stable behavior of the integrated circuit IC. In the way as described above, an energy-efficient burst mode is obtained wherein the power supply is only active during short periods of time to replenish the energy drawn by circuits connected to the secondary winding Ls.

FIG. 3 show waveforms for explaining the operation of the embodiment as shown in FIG. 2. FIG. 3A shows the current Id in the main current path of the switching element S. FIG. 3B shows the DC output voltage Vout. FIG. 3C shows the capacitor voltage Vc. FIG. 3D shows the current Io flowing in the main current path of the optocoupler transistor Tr.

The switching element S is switched on at instant t0. The current Id in the main current path of the switching element S starts rising. Due to the polarities of the primary winding Lp and the secondary winding Ls, the diode D1 is non-conductive and the DC-output voltage Vout decreases. The current I0 through the main path of the optocoupler transistor Tr is negligible because the DC-output voltage is lower than the predetermined level Vp. Consequently, the capacitor voltage Vc is kept substantially constant by the supply circuit Sc.

At instant t1, the current Id reaches a value at which the voltage across the main current path of the FET S reaches the reference level Vr1. The comparator Co resets the set-reset flip-flop, and the FET S is switched off. The energy stored in the primary winding Lp is transferred to the secondary winding Ls and the DC output voltage Vout increases. The DC output voltage Vout rises until instant t3. At the instant t3, the diode D1 stops conducting, and the DC output voltage Vout starts decreasing due to the current drawn by the load (P and/or Dc) coupled to the DC output voltage Vout.

At instant t2, the rising DC output voltage Vout reaches the predetermined level Vp, and the optocoupler transistor Tr starts withdrawing a current Io from the capacitor C1. Consequently, the capacitor voltage Vc starts decreasing. At instant t4, the capacitor voltage Vc drops below the reference voltage Vr2, and the FET S cannot be switched on anymore.

At the instant t5, the DC output voltage drops below the predetermined value Vp, the optocoupler transistor Tr stops drawing current from the capacitor C1, and the capacitor voltage Vc starts rising. At the instant t0', the capacitor voltage Vc reaches the reference level Vr3, and the FET S is switched on at the first set pulse Sp occurring after instant t0'. The FET S will be switched on and off one or more times until the DC output voltage Vout again rises above the predetermined level Vp. In FIG. 3 it is assumed that the next periodical set pulse Sp after the instant t0 occurs later than the instant t4. If the next periodical set pulse Sp occurred before the instant t4, the FET S would be switched on a second time, the DC output voltage Vout would rise to a higher value and it would last longer after the instant t4 before the FET S was switched on again.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The part of integrated circuit Ic controlling the switching element S can be implemented by means of hardware comprising several distinct elements, and by means of a suitably programmed computer. In the device claim enumerating several means, several of these means can be embodied by one and the same item of hardware.

What is claimed is:

1. A switched-mode power supply comprising:
    a series arrangement of an inductor (Lp) and a main current path of a switching element (S), the series arrangement being coupled to receive a DC input voltage (Vin),
    a rectifier element (D2) coupled to the inductor (Lp; Ls) for generating a DC output voltage (Vout),
    a feedback circuit (Fb) comprising an output for indicating whether a value of the DC output voltage (Vout) exceeds a predetermined value (Vp), a control circuit (Cc) having an output coupled to a control input of the switching element (S) for periodically switching said main current path on and off when the value of the DC output voltage (Vout) is below said predetermined value (Vp), and for keeping said main current path in a non-conductive state when the value of the DC output voltage (Vout) exceeds said predetermined value (Vp) to obtain a burst mode, a capacitor (C1), and a supply circuit (Sc) for generating a capacitor voltage (Vc) across the capacitor (C1) for supplying power to the control circuit (Cc), characterized in that the output of the feedback circuit (Fb) is coupled to the capacitor (C1) for influencing the capacitor voltage (Vc) in dependence on the value of the DC output voltage (Vout), the control circuit (Cc) further receiving the capacitor voltage (Vc) for periodically switching said main current path on and off when the capacitor voltage (Vc) is in a first range indicating that the DC output voltage (Vout) is lower than the predetermined value (Vp), and for keeping said main current path in a non-conductive state when said capacitor voltage (Vc) is in a second range indicating that the DC output voltage (Vout) exceeds the predetermined value (Vp), said first and second range being non-overlapping.

2. A switched-mode power supply as claimed in claim 1, characterized in that the switched-mode power supply comprises a three-terminal integrated circuit (Ic) comprising the switching element (S) and the control circuit (Cc), said main current path being arranged between a first and second terminal (T1, T2) of said integrated circuit (Ic), said feedback circuit (Fb), said capacitor (C1), and said supply circuit (Sc) all being coupled to a third terminal (T3) of said integrated circuit (Ic).

3. A switched-mode power supply as claimed in claim 2, characterized in that said three-terminal integrated circuit (Ic) further comprises the supply circuit (Sc) being coupled between the third terminal (T3) and the first terminal (TI), said first terminal (TI) being coupled to the inductor (Lp).

4. A switched-mode power supply as claimed in claim 1, characterized in that the switched-mode power supply further comprises a comparator circuit (Co) for determining an instant (t1) when said main current (Id) flowing through said main current path crosses a predetermined current value to switch off said main path at substantially said instant (t1).

5. A switched-mode power supply as claimed in claim 1, characterized in that the control circuit (Cc) comprises a voltage detector (Ud) for keeping said main current path in the off state when said capacitor voltage (Vc) is below a first reference level (Vr2) being selected outside said first range, and for allowing said main current path to be periodically switched on and off when said capacitor voltage (Vc) is above a second reference level (Vr3) being selected outside said second range, the second reference level (Vr3) being not lower than the first reference level (Vr2).

6. A display apparatus comprising a display device (Dd), a control microprocessor (P), a drive circuit (Dc) coupled to the display device (Dd) to supply drive voltages, and a switched-mode power supply coupled to the control microprocessor (P) to supply a power supply voltage (Vout), the switched-mode power supply comprising:

a series arrangement of an inductor (Lp) and a main current path of a switching element (S), the series arrangement being coupled to receive a DC input voltage (Vin), a rectifier element (D2) coupled to the inductor (Lp;Ls) for generating the power supply voltage (Vout), a feedback circuit (Fb) comprising an output for indicating whether a value of the power supply voltage (Vout) exceeds a predetermined value (Vp), a control circuit (Cc) having an output coupled to a control input of the switching element (S) for periodically switching said main current path on and off when the value of power supply voltage (Vout) is below said predetermined value (Vp), and for keeping said main current path in a non-conductive state when the value of the power supply voltage (Vout) exceeds said predetermined value (Vp) to obtain a burst mode, a capacitor (C1), and a supply circuit (Sc) for generating a capacitor voltage (Vc) across the capacitor (C1) for supplying power to the control circuit (Cc), characterized in that the output of the feedback circuit (Fb) is coupled to the capacitor (C1) for influencing the capacitor voltage (Vc) in dependence on the value of the power supply voltage (Vout), the control circuit (Cc) further receiving the capacitor voltage (Vc) for periodically switching said main current path on and off when the capacitor voltage (Vc) is in a first range indicating that the power supply voltage (Vout) is lower than the predetermined value (Vp), and for keeping said main current path in a non-conductive state when said capacitor voltage (Vc) is in a second range indicating that the power supply voltage (Vout) exceeds the predetermined value (Vp), said first and second range being non-overlapping.

* * * * *